(12) United States Patent
Ryon et al.

(10) Patent No.: US 11,713,717 B2
(45) Date of Patent: Aug. 1, 2023

(54) SECTIONAL FUEL MANIFOLDS

(71) Applicant: Delavan Inc., West Des Moines, IA (US)

(72) Inventors: Jason Ryon, Carlisle, IA (US); Lev A. Prociw, Johnston, IA (US); Gregory A. Zink, Des Moines, IA (US)

(73) Assignee: Collins Engine Nozzles, Inc., Des Moines, IA (US)

( * ) Notice: Subject to any disclaimer, the term of this patent is extended or adjusted under 35 U.S.C. 154(b) by 63 days.

(21) Appl. No.: 17/525,386

(22) Filed: Nov. 12, 2021

(65) Prior Publication Data

US 2022/0065167 A1    Mar. 3, 2022

Related U.S. Application Data

(62) Division of application No. 16/518,282, filed on Jul. 22, 2019, now Pat. No. 11,187,155.

(51) Int. Cl.
*B33Y 80/00* (2015.01)
*F02C 7/22* (2006.01)
(Continued)

(52) U.S. Cl.
CPC ......... *F02C 7/222* (2013.01); *F02M 37/0011* (2013.01); *F02M 63/0225* (2013.01);
(Continued)

(58) Field of Classification Search
CPC .................... F23R 3/42–3/60; F02C 7/222
See application file for complete search history.

(56) References Cited

U.S. PATENT DOCUMENTS

| 2,970,438 A | 2/1961 | Howald |
| 8,272,219 B1 | 9/2012 | Johnson et al. |
| (Continued) | | |

FOREIGN PATENT DOCUMENTS

| EP | 1167882 A1 | 1/2002 |
| EP | 1830036 A2 | 9/2007 |
| (Continued) | | |

OTHER PUBLICATIONS

Extended European Search Report dated Jun. 18, 2020, issued during the prosecution of European Patent Application No. EP 19213478.1.

*Primary Examiner* — Jacob J Cigna
(74) *Attorney, Agent, or Firm* — Locke Lord LLP; Joshua L. Jones; Scott D. Wofsy

(57) ABSTRACT

A multipoint fuel injection system comprises an injection system segment including a circumferentially extending outer support defining a fuel manifold with a plurality of manifold passages extending circumferentially therethrough. A first connector is included at a first circumferential end of the outer support and a second connector is included at a second circumferential end of the outer support opposite the first circumferential end. The first and second connectors are each configured to connect each manifold passage with a manifold passages of a respective outer support of a circumferentially adjacent injection system segment. The system includes a circumferentially extending inner support and a plurality of circumferentially spaced apart feed arms extending radially between the inner support and the outer support. A plurality of outlet openings extend in an axial direction from each feed arm for feeding respective injection nozzles.

6 Claims, 5 Drawing Sheets

(51) Int. Cl.
  *F02M 37/00* (2006.01)
  *F02M 61/16* (2006.01)
  *F02M 63/02* (2006.01)
  *F02M 69/46* (2006.01)
  *F02M 69/50* (2006.01)
  *F23R 3/26* (2006.01)
  *F23R 3/28* (2006.01)
  *F23R 3/10* (2006.01)

(52) U.S. Cl.
  CPC .......... *F02M 69/462* (2013.01); *F02M 69/50* (2013.01); *F23R 3/26* (2013.01); *F23R 3/28* (2013.01); *B33Y 80/00* (2014.12); *F02M 61/168* (2013.01); *F05D 2220/32* (2013.01); *F23R 3/10* (2013.01); *F23R 2900/00018* (2013.01)

(56) References Cited

U.S. PATENT DOCUMENTS

| | | | |
|---|---|---|---|
| 8,418,468 B2 | 4/2013 | McMahan et al. | |
| 8,984,896 B2* | 3/2015 | Davenport | F23R 3/007 60/752 |
| 9,644,844 B2 | 5/2017 | Prociw | |
| 9,784,187 B2 | 10/2017 | Wolfe et al. | |
| 10,041,679 B2* | 8/2018 | Prociw | F02C 7/222 |
| 10,364,751 B2* | 7/2019 | Ryon | F23R 3/346 |
| 10,605,171 B2* | 3/2020 | Ryon | F02C 7/222 |
| 11,022,240 B2* | 6/2021 | Barra | F02C 7/047 |
| 11,035,296 B2* | 6/2021 | Ryon | F23R 3/60 |
| 11,060,459 B2* | 7/2021 | Ryon | F02C 7/222 |
| 11,187,153 B2* | 11/2021 | Broome | F02K 3/10 |
| 11,408,609 B2* | 8/2022 | Prociw | F23R 3/005 |
| 2010/0146928 A1 | 6/2010 | Morenko et al. | |
| 2011/0247590 A1 | 10/2011 | Donovan | |
| 2015/0121883 A1* | 5/2015 | Wolfe | F02C 7/222 60/739 |
| 2016/0146468 A1 | 5/2016 | Gao et al. | |
| 2016/0160687 A1 | 6/2016 | Eastwood et al. | |
| 2016/0377292 A1* | 12/2016 | Prociw | F23R 3/002 60/753 |
| 2017/0037783 A1* | 2/2017 | Ryon | F23R 3/28 |
| 2017/0050242 A1 | 2/2017 | Melton | |
| 2017/0342907 A1 | 11/2017 | Morenko | |
| 2017/0350598 A1 | 12/2017 | Boardman et al. | |
| 2017/0363294 A1 | 12/2017 | Grooms et al. | |
| 2018/0080384 A1* | 3/2018 | Prociw | F02C 7/222 |
| 2018/0128492 A1 | 5/2018 | Boardman et al. | |
| 2018/0156126 A1 | 6/2018 | Snyder | |
| 2018/0202365 A1 | 7/2018 | Hanson | |
| 2018/0283692 A1 | 10/2018 | Ryon et al. | |
| 2018/0355746 A1 | 12/2018 | Barra et al. | |
| 2019/0107285 A1* | 4/2019 | Morenko | F23R 3/34 |
| 2019/0234310 A1* | 8/2019 | Morenko | F02C 7/222 |

FOREIGN PATENT DOCUMENTS

| | | |
|---|---|---|
| EP | 3382280 A1 | 10/2018 |
| EP | 3598003 A1 | 1/2020 |
| EP | 3598004 A1 | 1/2020 |
| EP | 3643969 A1 | 4/2020 |
| WO | 2013188723 | 12/2013 |

* cited by examiner

SECTIONAL FUEL MANIFOLDS

CROSS-REFERENCE TO RELATED APPLICATIONS

This is a divisional of U.S. patent application Ser. No. 16/518,282 filed Dec. 4, 2019, now U.S. Pat. No. 11,187,155 the disclosure of which is incorporated by reference herein in its entirety.

BACKGROUND

1. Field

The present disclosure relates to combustion systems, and more particularly to fuel manifolds for gas turbine engines.

2. Description of Related Art

Multipoint fuel injection systems would benefit from a simple, low cost fuel injector and manifold construction to permit a large number of injectors to be used. Traditional fuel injector and nozzle designs require complex manifolding that can impede air flow from a compressor to the combustor in a gas turbine engine. Advanced engines require thermal protection to prevent fuel from reaching a temperature where it can break down and grow internal carbon buildup. The conventional techniques have been considered satisfactory for their intended purpose. However, there is an ever present need for improved systems and methods for combustion systems. This disclosure provides a solution for this need.

SUMMARY

A multipoint fuel injection system comprises an injection system segment including a circumferentially extending outer support defining a fuel manifold with a plurality of manifold passages extending circumferentially therethrough. A first connector is included at a first circumferential end of the outer support and a second connector is included at a second circumferential end of the outer support opposite the first circumferential end. The first and second connectors are each configured to connect each manifold passage with a manifold passages of a respective outer support of a circumferentially adjacent injection system segment. The system includes a circumferentially extending inner support and a plurality of circumferentially spaced apart feed arms extending radially between the inner support and the outer support. A plurality of outlet openings extend in an axial direction from each feed arm for feeding respective injection nozzles, wherein the feed arm defines a plurality of fuel passages therethrough in fluid communication with the fuel manifold and outlet openings to supply fuel from the fuel manifold to the outlet openings.

The manifold passages can have a vaulted cross-sectional flow area. Each of the first and second connectors can include a transition region wherein each manifold passage transitions from the vaulted cross-sectional flow area to a circular flow area for connection to connector tubes. The injection system segment can be a first injection system segment of a plurality of such injection system segments, wherein the injection system segments are connected circumferentially together with each respective first connector connected to a respective second connector of a circumferentially adjacent one of the injection system segments by a respective segment connector. Each segment connector can include a plurality of connector tubes connecting between circumferentially adjacent connectors. One of the segment connectors can include a system inlet for supplying fuel to the manifolds of the injection system segments. Each segment connector can include a heat shield shielding the connector tubes.

The injection system segments can be additively manufactured. The outer supports can define an outer diameter greater than 10 inches (25.4 cm), or even greater than 15 inches (38.1 cm). A single heat shield can extend from the outer support to the inner support and extending about the outer support and the feed arms to provide heat shielding to the fuel manifold and the fuel passages.

The feed arm and a portion of the heat shield adjacent to the feed arm can follow a vaulted angle. The feed arm and the portion of the heat shield adjacent to the feed arm can define at least one vaulted peak pointed in an axial direction opposite that of the outlet openings. The manifold passages can have axially oriented vaulted surfaces. The fuel passages in the feed arm can define a plurality of axially vaulted chambers.

The system can include a combustor dome configured for defining a combustion space. The system can include a plurality of injection nozzles extending from the outlet openings of the feed arm through the combustor dome for injection of fuel from the feed arm into the combustor space.

A method includes additively manufacturing a plurality of injection system segments, each including a circumferentially extending outer support together with a circumferentially extending inner support, a feed arm extending radially between the inner support and the outer support, wherein the additively manufacturing includes building in an axial build direction beginning from downstream portions of the inner and outer supports for each injection system segment. The method includes joining the injection system segments together circumferentially end to end to form a multipoint fuel injection system.

Additively manufacturing the injection system segments can be performed on one or more additively manufacturing systems, each having a smaller build area than the diameter of the multipoint fuel injection system. Joining the injection system segments together can include brazing the segments to connector tubes connecting circumferentially between circumferentially adjacent ones of the segments. The method can include assembling a respective heat shield about the connector tubes connecting between circumferentially adjacent pairs of the segments. Additively manufacturing can include forming a heat shield extending from the outer support to the inner support and extending about the outer support and the feed arm. Additively manufacturing can include forming vaulted fuel manifold passages in the outer support.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
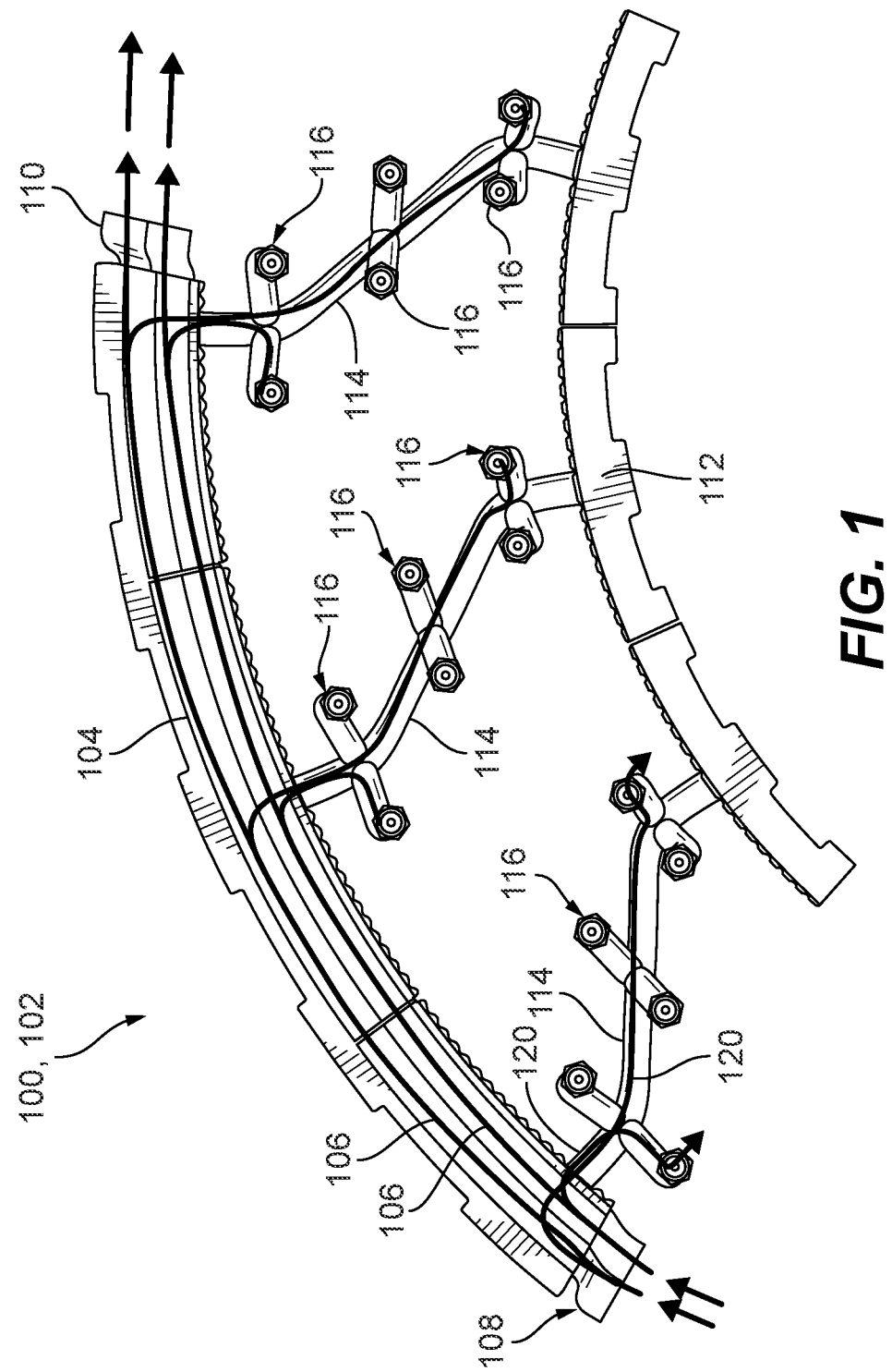
FIG. 1 is an inlet end elevation view of an embodiment of a portion of multipoint fuel injection system in accordance with the present disclosure, showing the one of the injection system segments.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-7, as will be described. The systems and methods described herein can be used to facilitate manufacturing of internally manifolded multipoint fuel injection systems such as in gas turbine engines.

The multipoint fuel injection system 100 comprises a plurality of injection system segments 102, one of which is shown in FIG. 1. The injection system segment 102 includes a circumferentially extending outer support 104 defining a fuel manifold therein with a plurality of manifold passages 106 (labeled in FIG. 4) extending circumferentially therethrough. A first connector 108 is included at a first circumferential end of the outer support 104. A second connector 110 is included at a second circumferential end of the outer support 104 opposite the first circumferential end. The first and second connectors 108, 110 are each configured to connect each manifold passage 106 (schematically shown in FIG. 1, but see FIG. 4) with a manifold passages 106 of a respective outer support 104 of a circumferentially adjacent injection system segment 102, as shown in FIGS. 2-3.

With continued reference to FIG. 1, the injection system segment 102 includes a circumferentially extending inner support 112 and a plurality of circumferentially spaced apart feed arms 114 extending radially between the inner support 112 and the outer support 104. A plurality of outlet openings 116 extend in an axial direction A (labeled in FIG. 4, but which is into and out of the view in FIG. 1) from each feed arm 114 for feeding respective injection nozzles 118 (labeled in FIG. 3). The feed arm 114 defines a plurality of fuel passages 120 therethrough in fluid communication with the fuel manifold passages 106 and outlet openings to supply fuel from the fuel manifold to the outlet openings. The flow paths through two of the manifold passages 106 and respective fuel passages 120 are schematically indicated by the flow arrows in FIG. 1, but those skilled in the art will readily appreciate that there are a total of six such flow paths feeding the six respective outlets 116 of each feed arm 114.

Figure 2:
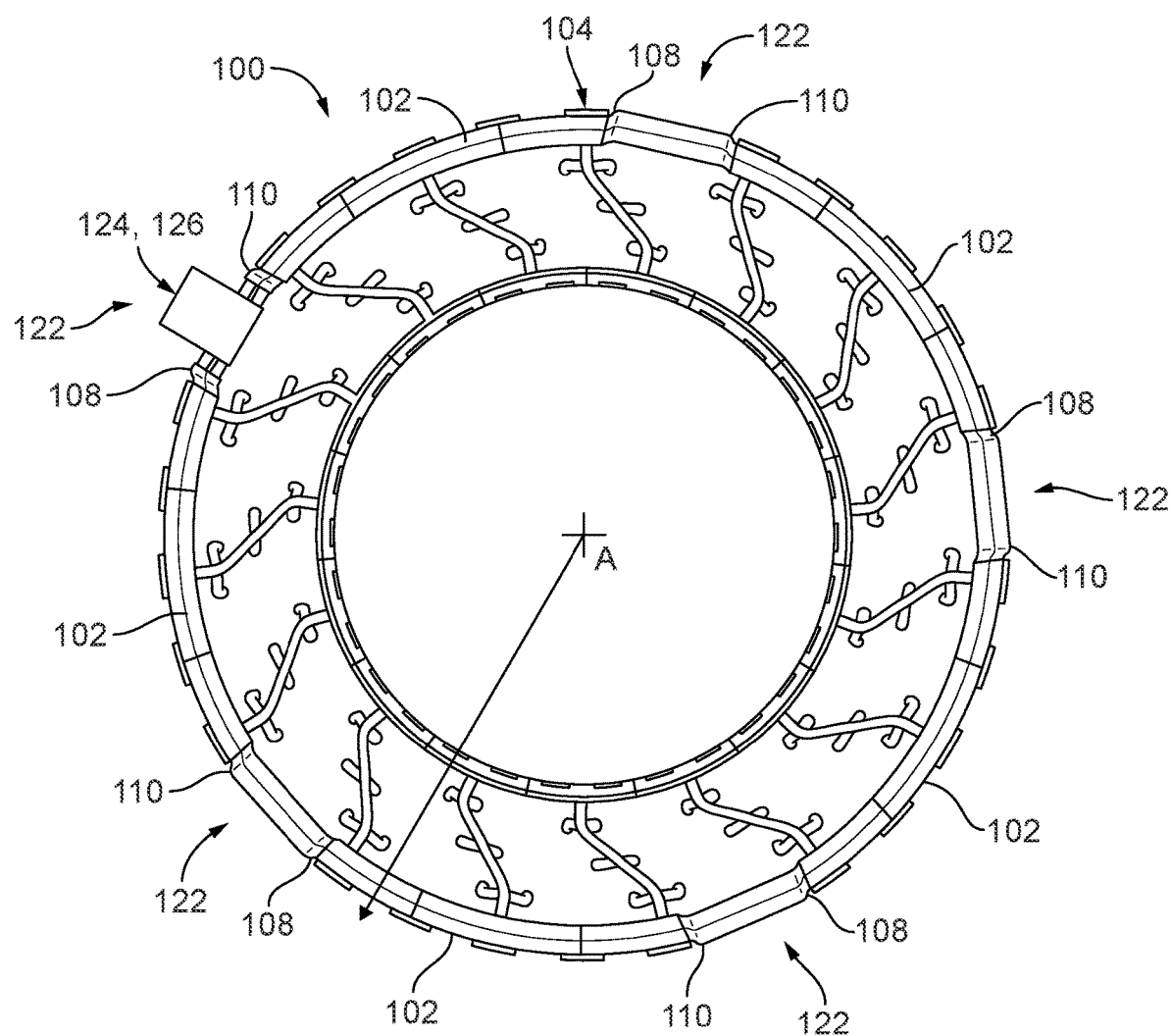
FIG. 2 is an inlet end elevation view of the system of FIG. 1, showing five injection system segments connected together.

With reference now to FIG. 2, the system 100 includes five injection system segments 102, each as described above with reference to FIG. 1. Those skilled in the art will readily appreciate that any suitable number of segments besides five can be used for a given application. The injection system segments 102 are connected circumferentially together with each respective first connector 108 connected to a respective second connector 110 of a circumferentially adjacent one of the injection system segments 102 by a respective segment connector 122. One of the segment connectors 124 includes a system inlet 126 for supplying fuel to the manifolds of the injection system segments 102.

Figure 3:
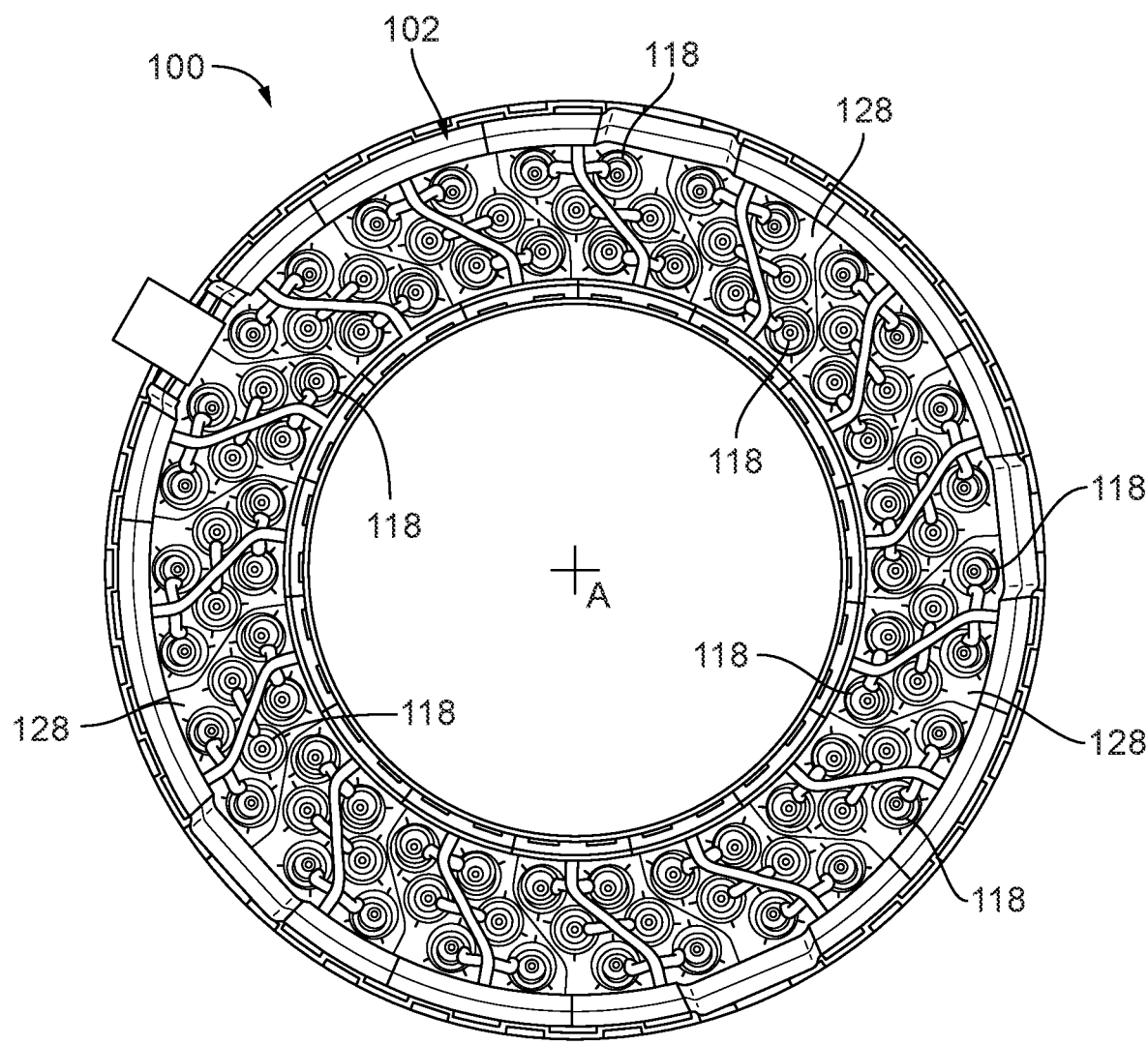
FIG. 3 is an inlet end elevation view of the system of FIG. 1, showing the combustor dome and injection nozzles.

With reference now to FIG. 3, the system 100 includes a combustor dome 128 configured for defining a combustion space downstream thereof. The combustor dome 128 can separate between upstream compressor components and downstream combustor and turbine components, i.e. in a gas turbine engine. A plurality of injection nozzles 118 extend from the outlet openings 116 (labeled in FIG. 1) of the feed arms 114 through the combustor dome 128 for injection of fuel from the feed arms 114, and for the injection of compressed air for mixing with the fuel, into the combustor space for combustion.

Figure 4:
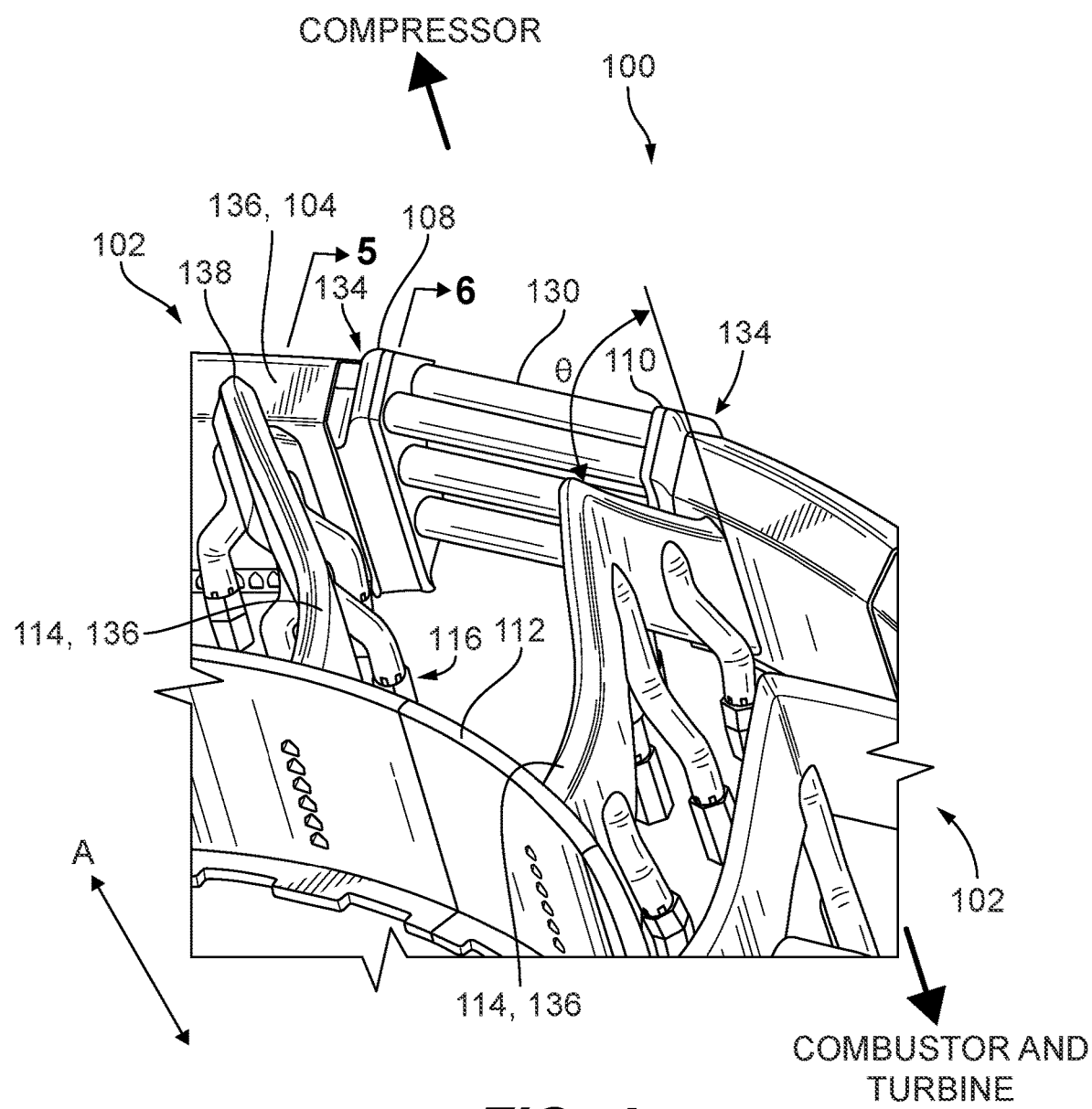
FIG. 4 is a perspective view of a portion of the system of FIG. 1, showing the connection between two of the injection system segments.
Figure 5:
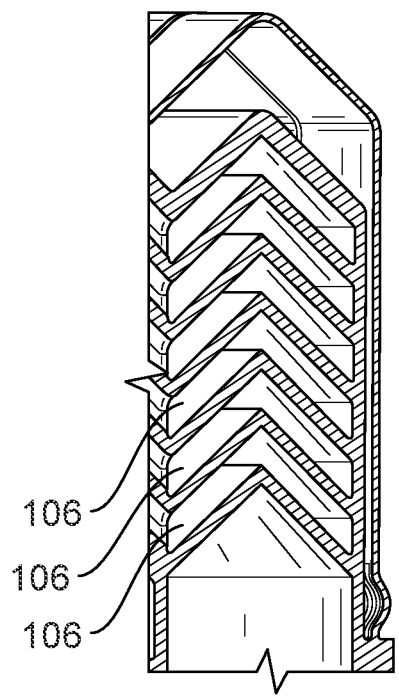
FIG. 5 is a radial cross-sectional elevation view of a portion of the system of FIG. 1, showing the manifold passages at the location indicated in FIG. 4.
Figure 6:
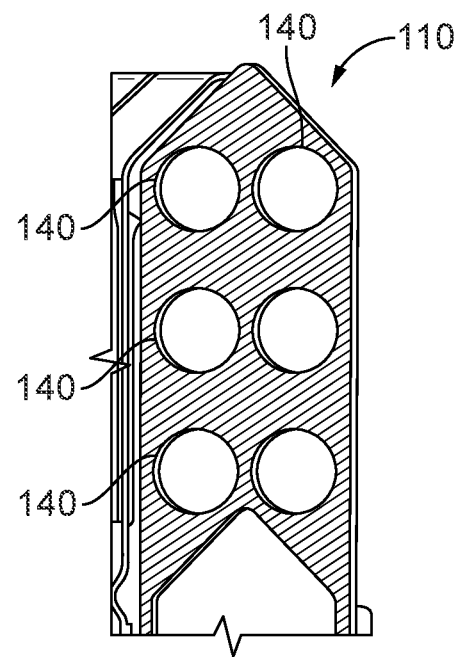
FIG. 6 is a radial cross-sectional elevation view of a portion of the system of FIG. 1, showing the circular flow area at the location indicated in FIG. 4 for connection of the injection system segment to the connector tubes.

With reference now to FIG. 4, each segment connector 122 includes a plurality of connector tubes 130 connecting between circumferentially adjacent connectors 108 and 110 of two respective segments 102. Each of the first and second connectors 108 and 110 includes a transition region 134 wherein each manifold passage 106 transitions from the vaulted cross-sectional flow area shown in FIG. 5 to a circular flow area 140 as shown in FIG. 6 for connection to the connector tubes 130.

Figure 7:
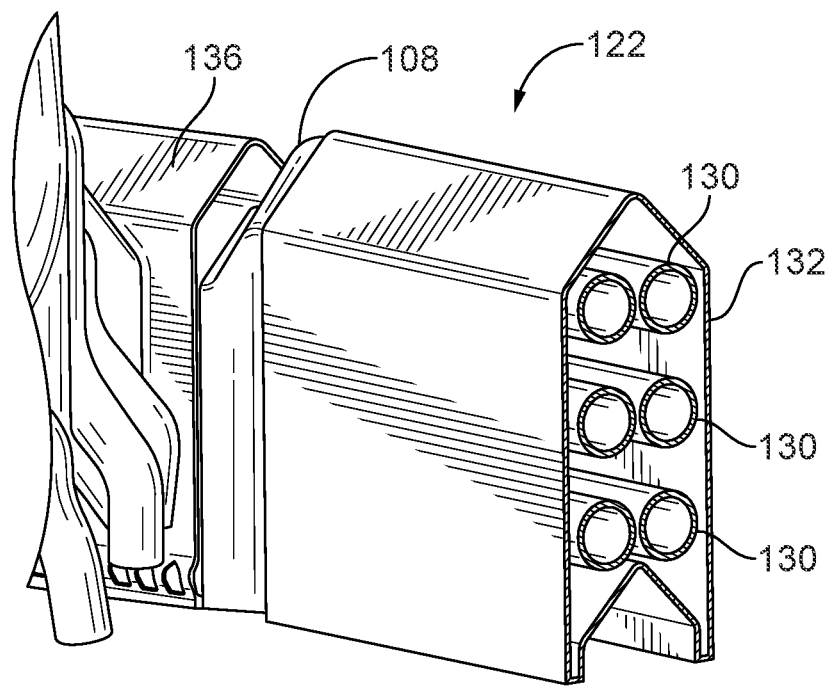
FIG. 7 is a perspective view of a portion of the system of FIG. 1, showing a heat shield over the connector tubes.

With reference now to FIG. 7, each segment connector 122 includes a heat shield 132 shielding the connector tubes 130. A single heat shield 136 extends from the outer support 104 to the inner support 112 and extending about the outer support 104 and the feed arms 114 to provide heat shielding to the fuel manifold passages 106 and the fuel passages 120 (labeled in FIG. 1). As shown in FIG. 4, the feed arms 114 and a portion of the heat shield 136 adjacent to the feed arms can follow a vaulted angle θ relative to the axial direction A, and define a vaulted peak 138 pointed in an axial direction A opposite that of the outlet openings 116. The manifold passages 106 (labeled in FIG. 5) have a vaulted cross-sectional flow area defined by chevron-shaped surfaces oriented to peak in the axial direction A. The fuel passages 120 (labeled in FIG. 1) in the feed arms 114 can define a plurality of similarly axially vaulted chambers to those of the manifold passages 106, peaking in the same direction. The vaulted angles on surfaces described here facilitate self-supporting of the heat shield 136, feed arms 114, fuel passages 120, and manifold passages 106 during additive manufacture.

The injection system segments 102 can be additively manufactured individually in a single additive manufacturing system, or multiple additive manufacturing systems (e.g. simultaneously). The outer supports 104 can define an outer diameter OD (labeled in FIG. 2) greater than 10 inches (25.4 cm), or even greater than 15 inches (38.1 cm), but the individual segments 102 are small in enough to be additively manufactured in a build area much smaller than the outer diameter OD. For example, in a typical gas turbine engine the outer diameter OD for the fuel manifold may be 20 inches (50.8 cm), or even greater than 40 inches (101.6 cm), but using systems and method as disclosed herein, the fuel injection system 100 can be produced on additive manufacturing platforms (e.g., powder bed fusion) with build areas of 10 by 10 inches (25.4 cm) or 15 by 15 inches (38.1 cm). Additively manufacturing in this method includes building in an axial build direction A (identified in FIG. 4) beginning from downstream portions (e.g. the bottom as oriented in FIG. 4) of the inner and outer supports 104, 112 for each injection system segment 102.

The method includes joining the injection system segments 102 together circumferentially end to end to form a complete multipoint fuel injection system 100. Joining the injection system segments 102 together can include brazing the openings of the circular flow areas 140 (labeled in FIG. 6) of the connectors 108, 110 of the segments 102 to connector tubes 130 connecting circumferentially between circumferentially adjacent ones of the segments 102. The method can include assembling a respective heat shield 132 (labeled in FIG. 7) about the connector tubes 130 connecting between circumferentially adjacent pairs of the segments 102. The inlet connector 124 can be brazed to the respective connectors 108, 110 of one pair of adjacent injection system segments 102, and can be shielded with a similar heat shield to that shown in FIG. 7.

The methods and systems of the present disclosure, as described above and shown in the drawings, provide for multipoint fuel injection systems with superior properties including improved manufacturability. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method comprising:
    additively manufacturing a plurality of injection system segments, each including a circumferentially extending outer support together with a circumferentially extending inner support, a feed arm extending radially between the inner support and the outer support, wherein the additively manufacturing includes building in an axial build direction beginning from downstream portions of the inner and outer supports for each injection system segment; and
    joining the injection system segments together circumferentially end to end to form a multipoint fuel injection system.

2. The method as recited in claim 1, wherein the multipoint fuel injection system has an outer diameter, wherein additively manufacturing the injection system segments is performed on one or more additively manufacturing systems, each having a smaller build area than the diameter of the multipoint fuel injection system.

3. The method as recited in claim 2, wherein joining the injection system segments together includes brazing the segments to connector tubes connecting circumferentially between circumferentially adjacent ones of the segments.

4. The method as recited in claim 3, further comprising assembling a respective heat shield about the connector tubes connecting between circumferentially adjacent pairs of the segments.

5. The method as recited in claim 1, wherein additively manufacturing includes forming a heat shield extending from the outer support to the inner support and extending about the outer support and the feed arm.

6. The method as recited in claim 3, wherein additively manufacturing includes forming vaulted fuel manifold passages in the outer support.

* * * * *